Sept. 30, 1969   A. PITNER   3,469,896
FLEXIBLE THRUST ROLLING BEARING HAVING NEEDLES OR ROLLERS
Filed Nov. 13, 1967

PRIOR ART

United States Patent Office 3,469,896
Patented Sept. 30, 1969

3,469,896
FLEXIBLE THRUST ROLLING BEARING HAVING NEEDLES OR ROLLERS
Alfred Pitner, Paris, France, assignor to Nadella S.A., Rueil-Malmaison, France, a French body corporate
Filed Nov. 13, 1967, Ser. No. 682,061
Claims priority, application France, Dec. 28, 1966, 89,096
Int. Cl. F16c 17/06, 17/08, 19/30
U.S. Cl. 308—231                               6 Claims

ABSTRACT OF THE DISCLOSURE

A thrust needle bearing in which the raceway plates bear against mechanical elements through their inner edges which are radially offset relative to the ring of needles applied against the plates, these needles being contained in a cage whose aperture-defining bars have a polygonal sectional shape in the radial plane of the bearing which defines for the plane and parallel flanks of the aperture end portions located in alignment with the diametral plane of the needles for guiding the latter and a centre portion offset relative to the diametral plane.

---

The present invention relates to thrust rolling bearings having needles or rollers which comprise two annular raceway plates whose zones of support on the mechanical elements with which the bearing is assembled are radially offset so that the plates are subjected under axial load to a bending deformation which imparts thereto a conical shape.

Such an arrangement satisfies a constructional requirement or a decision on the part of the constructor to obtain an axial prestressing, the plates of the bearing behaving in this case in the manner of Belleville washers.

In known thrust bearings, the cage or grid which contains and guides the rolling elements is obtained by the assembly of two apertured washers disposed on each side of the diametral plane of the rolling elements. It must be admitted that, when the plates assume a conical shape under axial load, the cage remains plane since it can only be stressed by the rolling elements, and if the latter imparted a conical shape thereto, the stresses between the elements and the cage would have such value that operation of the bearing would become impossible. The rolling elements which are maintained between the two conical raceways therefore assume an inclination relative to the apertures of the cage so that the bearing of the rolling elements on the edges of the apertured washers constituting the cage which—in the absence of deformation of the plates—occurred along generatrices of the elements, only occurs at extremely small points. The guiding of the rolling elements is thus rendered defective. Moreover, in order to avoid the dangerous stresses mentioned hereinbefore in the course of the inclination of the rolling elements, relatively large clearance must be provided between these elements and the edges.

To avoid these drawbacks, the object of the invention is to provide a thrust bearing comprising, for the raceway plates, support or bearing zones which are such that, bearing in mind in particular the thickness of these plates and the length of the rolling elements, the plates in deforming are maintained substantially in contact with two generatrices of each of the rolling elements and, for the cage or grid a shape which is already known in thrust bearings having rigid raceway plates in accordance with which the cage is in one piece and the apertures are defined by flanks which comprise end portions located in alignment with the diametral plane of the rolling elements and a centre portion which is axially offset relative to said diametral plane.

Owing to this arrangement, the guiding of the rolling elements occurs by contact of the end portions of the apertured flanks with the generatrices of the rolling elements located in the diametral plane of the latter, and this linear guiding is maintained when the rolling elements are inclined relative to the apertures under the effect of the deformation of the raceway plates, the diametral generatrices sweeping through the plane faces of the opposed flanks of an aperture. Further, the angular movement of the rolling elements can be inscribed between these two plane faces without the clearance normally provided varying for needles having a variable orientation and therefore must be increased.

The offset centre portion of the aperture flanks receives conventional means for retaining the rolling elements before placing the thrust bearing in position, such as lugs or projections having a circumferential orientation and whose centre situation precludes any contact thereof with the rolling elements in the course of the relative movements of inclination.

Preferably, the section of the bars which define the apertures has a curved or an equivalent polygonal shape in a radial direction.

Further features and advantages of the invention will be apparent from the ensuing description with reference to the accompanying drawing.

Figure 1:
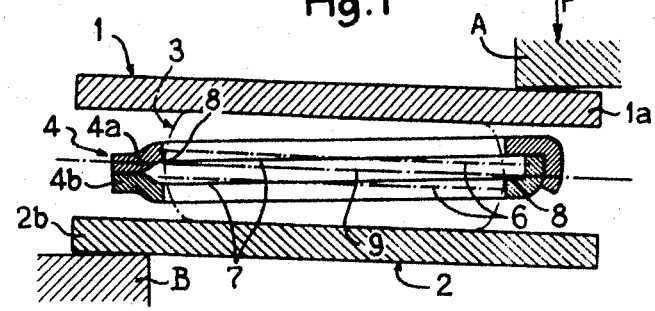
FIG. 1 is an axial sectional view of a thrust rolling bearing having deformable raceway plates, including a needle cage, of conventional construction.

The raceway plates 1, 2 of the prior art thrust rolling bearing shown in FIG. 1, whose cage is of conventional type, are relatively thin and bear against mechanical elements A and B through their inner edge 1$a$ and outer edge 2$b$ which are located for example outside the annular space defined by the ring—of rolling elements or needles 3 applied against the plates 1, 2. For the purpose of simplifying the figure, it is assumed that the radial dimension of the supports A and B is such that the two plates are so deformed that the needles are in contact with the plates on two diametrally opposed generatrices. These needles are contained within apertures in a cage or grid 4 consisting of two blanked-out washers 4$a$, 4$b$ which are integral and, in the absence of axial load, located on each side of the diametral plane of needles 3. When the thrust bearing is subjected to an axial load F, plates 1, 2 bend and assume a conical shape (illustrated in an exaggerated manner). As a result, the guiding of the needles no longer occurs along the line of contact of the two generatrices 6, 6 with the corresponding edges 7, 7 of the washers 4$a$, 4$b$, but at the points of intersection 8, 8 of the, for example diametral, generatrices 9 and the edges 7, 7. Further, as the inclination of the needles causes the diametral generatrices 9 to approach the edges 7, 7 at the ends of the apertures there is a tendency to eliminate the normally provided operational clearance.

Figure 2:
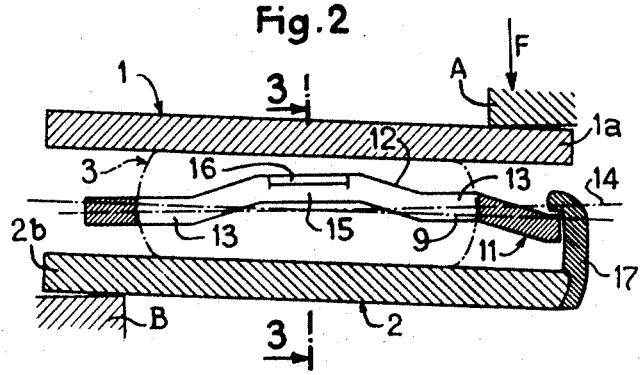
FIG. 2 is an axial sectional view of a thrust rolling bearing according to the invention.

FIG. 2 shows a thrust bearing according to the invention in which the operational drawbacks are eliminated.

The radial dimensions of the bearing of the raceway plates 1 and 2 on the elements A and B are such that, bearing in mind their diameters, their thickness and the length of the rolling elements or needles, these plates are deformed in being maintained substantially in contact with two generatrices of each of the needles. If it is impossible to take advantage of the dimensions of support on the elements A and B, intermediate annular members can be employed or shoulders can be provided on the plates 1 and 2 to ensure the desired deformation to achieve the contact of the needles with the two plates throughout their length.

Figure 3:
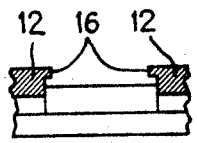
FIG. 3 is a sectional view taken along line 3—3 of FIG. 2.

The cage 11 of this thrust bearing, which is constructed by blanking and press-forming a piece of sheet, comprises apertures defined by bars 12 whose section, in the direction of the needles 3, has a polygonal shape which defines, for the plane and parallel flanks of the aperture, end portions 13, 13 which are located in alignment with the theoretical diametral plane 14 of the needles, for guiding the latter and a centre portion 15 which is offset relative to said plane and on which is provided a lug 16 (FIG. 3) which serves to retain the needles before assembly of the thrust bearing by cooperation with means, such as a collar 17, which is fitted onto the plate 2 and retains the cage 11 axially and radially relative to the plate 2.

Irrespective of the inclination of the needles in the course of operation, the end portions 13, 13 of the aperture flanks present a plane face in contact with the corresponding end zone of the diametral generatrices 9 of the needles for guiding the latter. Further, the operational clearance is maintained notwithstanding this inclination.

Figure 4:
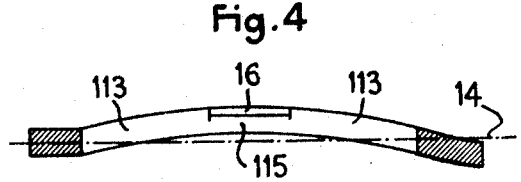
FIG. 4 is a view of a modification of the cage shown in FIG. 2.

In the modification of the cage 11 shown in FIG. 4, the section of the bars have a continuous curve whose centre portion 115 is offset relative to the theoretical diametral plane 14 of the needles, whereas the end portions 113 are in alignment with this plane.

Having now described my invention what I claim as new and desire to secure by Letters Patent is:

1. An axially flexible thrust rolling bearing comprising elongated rolling elements, a cage and two axially spaced deformable annular raceway plates engaged on each side of said rolling elements, said plates being intended to bear against the mechanical elements with which the bearing is intended to be assembled in zones which are respectively radially offset so that the plates are subjected under axial load to a bending deformation which imparts to said plates a conical shape, said cage being in one piece and including bars defining apertures for said rolling elements, each aperture being defined by plane parallel flanks which include end portions in alignment with the diametral plane of the corresponding rolling element and a centre portion which is axially offset relative to said diametral plane, said centre portion having rolling element retaining means, the extent of said end portions of said flanks axially of said bearing being such that, notwithstanding inclination of said rolling elements relative to said bars consequent to said bending deformation of said plates, said end portions remain in positions for guiding the corresponding rolling elements in said diametral planes thereof.

2. A bearing as claimed in claim 1, wherein the section of the bars which define the apertures has a polygonal shape in the radial plane of the bearing.

3. A bearing as claimed in claim 1, wherein the section of the bars has a curved shape in the radial plane of the bearing.

4. A bearing as claimed in claim 1, wherein the offset centre portion comprises circumferentially extending projections for retaining said rolling elements.

5. A bearing as claimed in claim 1, further comprising an element integral with one of said plates and capable of retaining said cage.

6. An assembly comprising, arranged on an axis a first member and a second member axially movable relative to said first member, and an axially flexible thrust rolling bearing interposed between and coaxial with said members, said bearing comprising elongated rolling elements, a cage and two axially spaced annular deformable normally plane raceway plates engaged on each side of said rolling elements, said first member axially bearing against one of said plates in a first circumferentially extending support zone adjacent the axis of the bearing relative to said rolling elements and said second member axially bearing against the other of said plates in a second circumferentially extending support zone remote from the axis of the bearing relative to said rolling elements, the radii of said support zones and the radial distance between said zones being so determined, as a function of the diameter and thickness of said plates and of the length of said rolling elements and of the position of said rolling elements relative to said plates, that a force urging said first member toward said second member on said axis causes said plates to so bend and deform that they have frustoconical shapes having parallel generatrices, whereby said plates remain in contact with two diametrically opposed generatrices of each of said rolling elements, said cage being in one piece and including bars defining apertures for said rolling elements, each bar being defined by plane parallel flanks which include end portions in alignment with the diametral plane of the corresponding rolling element and a substantially centre portion which is axially offset relative to said diametral plane and includes rolling element retaining means, the extent of said end portions of said flanks axially of said bearing being such that, notwithstanding inclination of said rolling elements relative to said bars consequent to said bending deformation of said plates, said end portions remain in positions for guiding the corresponding rolling elements in said diametral planes thereof.

References Cited
UNITED STATES PATENTS 2,995,406  8/1961  Pitner _____ 308—234

FOREIGN PATENTS 828,990  2/1960  Great Britain.

MARTIN P. SCHWADRON, Primary Examiner

FRANK SUSKO, Assistant Examiner

U.S. Cl. X.R.

308—234